United States Patent [19]

Viebranz et al.

[11] Patent Number: 5,756,936
[45] Date of Patent: May 26, 1998

[54] CYLINDRICAL RADIALLY SHRINKABLE SLEEVE FOR AN ELECTRICAL CABLE AND COMPOSITION THEREOF

[75] Inventors: Manfred G. G. Viebranz, Appel; Raymond A.W. Krabs, Hamburg; Dieter Hellbusch, Seevetal; Burkhard Muenchow, Hamburg, all of Germany; Craig Chamberlain, Woodbury, Minn.; Winfried H. Knorr, Hamburg, Germany

[73] Assignee: Minnesota Mining and Manufacturing Company, Saint Paul, Minn.

[21] Appl. No.: 718,526

[22] PCT Filed: May 17, 1995

[86] PCT No.: PCT/US95/06125

§ 371 Date: Oct. 8, 1996

§ 102(e) Date: Oct. 8, 1996

[87] PCT Pub. No.: WO95/31845

PCT Pub. Date: Nov. 23, 1995

[30] Foreign Application Priority Data

May 18, 1994 [DE] Germany .................... 44 17 363.6
May 18, 1994 [DE] Germany .................... 44 17 364.4

[51] Int. Cl.⁶ ........................................... H02G 15/184
[52] U.S. Cl. ................... 174/73.1; 174/74 A; 174/84 R; 174/DIG. 8
[58] Field of Search ....................... 174/73.1, 84 R, 174/DIG. 8, 72 C, 74 A

[56] References Cited

U.S. PATENT DOCUMENTS

| | | | |
|---|---|---|---|
| 3,585,274 | 6/1971 | Tomaszewski et al. | 174/73.1 |
| 3,670,091 | 6/1972 | Frantz et al. | 174/52.2 |
| 3,816,639 | 6/1974 | Anderson et al. | 174/73.1 |
| 4,304,616 | 12/1981 | Richardson | 174/73.1 X |
| 4,412,029 | 10/1983 | Kehr et al. | 524/441 |
| 4,579,882 | 4/1986 | Kambe et al. | 523/137 |

FOREIGN PATENT DOCUMENTS

| | | | |
|---|---|---|---|
| 0379056 A3 | 7/1990 | European Pat. Off. | |
| 0424090 A2 | 4/1991 | European Pat. Off. | |
| 0435569 A1 | 7/1991 | European Pat. Off. | |
| 1805353 | 6/1969 | Germany . | |
| 3226380 A1 | 2/1983 | Germany | 174/73.1 |
| 2042818 | 9/1980 | United Kingdom . | |

*Primary Examiner*—Kristine L. Kincaid
*Assistant Examiner*—Chau N. Nguyen
*Attorney, Agent, or Firm*—Matthew B. McNutt

[57] ABSTRACT

A cylindrical radially shrinkable sleeve (10) for enclosing a connection or an end termination of an electrical cable having an insulation surrounded by a shielding layer. The sleeve (10) has an outer shielding layer (16) of semi-conductive material and at least an insulation layer (14) on the inner side of the shielding layer (16). The cylindrical layers are made of flexible material adapted to be retained in a radially expanded state by a mechanical support. The radially innermost layer is of a homogeneous material having a relative dielectric constant which is larger than that of the insulation of the cable. The material is a matrix of dielectric plastic material containing microspheres which are electrically conductive either totally or only at the outer surface thereof, and which have a diameter between 10 and 500 μm. The microspheres are uniformly mixed into the matrix material, with the compound having a dielectric constant equal to or larger that 3 in a dielectric strength of at least 5 kV/mm.

35 Claims, 7 Drawing Sheets

CYLINDRICAL RADIALLY SHRINKABLE SLEEVE FOR AN ELECTRICAL CABLE AND COMPOSITION THEREOF

FIELD OF THE INVENTION

The invention refers to a cylindrical radially shrinkable sleeve for enclosing a connection or an end termination of an electrical cable.

BACKGROUND OF THE INVENTION

When making cable splices or cable end terminations, it is necessary to expose the conductor of the cable or the cable core. It is common to use radially shrinkable sleeves to enclose a connection or an end termination of an electrical cable. These sleeves consist either of a heat-shrinkable material or of elastic material. In the latter case, they are mechanically retained in an expanded state, usually by a removable core. When the core is removed, the sleeve engages the cable connection or the cable end termination under pressure.

Examples of mechanical support cores are disclosed in DE 37 15 915 and EP 0 379 056. The latter publication also discloses a sleeve composed of two layers, with the outer layer having a residual deformation smaller than that of the radially innermost sleeve after the installation of the sleeve. The layers can be manufactured by co-extrusion.

Known shrinkable sleeves for the use in the medium voltage range normally have a three-layer structure for electrophysical reasons. The inner layer is provided with field controlling properties. This layer can extend throuhout the length of the sleeve as proposed by EP 0 079 118 or, alternatively, consists of three spaced portions, namely a central electrode and two electrodes at the ends as known from DE 39 43 296. The electrodes provide for a uniform distribution of the electrical field in the connection area of the cable conductors and at the ends in the transition area to the cable insulation as well. A second layer, which normally has a larger thickness, serves for insulation purposes, and so it is manufactured from suitable insulation material. An outer layer of semi-conductive material serves for the necessary shielding effect.

Sleeves having cylindrical layers can be molded by extrusion or injection molding. In the latter method, the layers are molded by successive injection molding and adhered to each other thereby. Co-extrusion of the sleeve according to the DE 39 43 296 is not possible Rather, the electrodes have to be manufactured by injection molding.

From U.S. Pat. No. 4,390,745, a cylindrical sleeve has become known composed of two separate sleeve portions of heat-shrinkable material. The first or inner sleeve portion has an insulating layer, a dielectric portion at least at one extremity of the sleeve, and a conductive portion spaced from the dielectric portion provided at the inner side of the insulating layer. The second or outer sleeve portion includes an insulating layer and a semi-conductive layer provided at the outer side thereof. The dielectric layer at the inner side and the conductive portion are provided to effect a refractive field control, i.e., to make the field distribution relatively uniform in order to build up electrophysical conditions similar to that of the cable.

The semi-conductive inner layer or the electrodes of the sleeve according to DE 39 43 296 consist of a suitable field controlling material which according to U.S. Pat. No. 34 12 029 may include a permanent flexible dielectric basic material into which a finely divided effective substance is mixed which may consist of dustfine particles of an electrically polarizable material of low electrical conductivity. For example, carbon black may he used as effective substance. Further, an additional effective substance is used which is metallic conductive. As to this, microspheres having a diameter of at least 2 µm are proposed. The microspheres are at least surface-conductive and may for example consist of aluminum. With such a field controlling material, a relative dielectric constant $\epsilon_r$ of 30 to 300 is achieved. Such a field controlling material, therefore, is particularly suited for sleeves which are used with high voltage cables.

U.S. Pat. No. 4,547,312 discloses an elastomeric electrically conductive mass which is composed of an elastomer and metallic coated microspheres mixed into the elastomer and having a diameter of 5 µm. The microspheres are added in great quantity. The substance thus achieved serves as a coating of articles in order for make their surface conductive.

From DE 27 30 555 it has become known to add 30 to 70% by volume glass spheres having a diameter of between 0.1 to 5 mm to insulating masses for electrical cables. The glass spheres serve to reduce the content of more expensive insulating material, e.g. plastic material.

From EP 0 189 720, it has become known to add hollow microspheres to a silicone elastomer or a silicone resin for thermal insulation purposes.

From DE 32 26 380, it has become known to place a plurality of electrodes forming spheres into an insulating material for enclosing a cable connection or a cable and termination. To this purpose, layers of insulating material are provided with conductive spheres in the diameter range of 0.5 to 10 µm. By this method the insulating material obtains field controlling properties.

As a consequence of the relatively large spheres the mass obtained cannot be considered homogeneous. It is further relatively difficult to uniformly distribute the relatively large spheres in the elastomeric matrix. Therefore, in the mentioned publication it is explained to use strips of plastic material into which the spheres are uniformly embedded. Thereafter, the strips are wrapped around the cable connection. This method is relatively expensive and does not lead to the desired electrophysical properties in view of the field control. Further, the danger exists that the insulation properties suffer.

From U.S. Pat. No. 5,232,775, it has become known to add metal coated spheres, e.g. glass bubbles, to a polymeric resin in order to achieve a semi-conductive, static dissipative composition.

From U.S. Pat. No. 4,618,325, and U.S. Pat. No. 4,579,882, it has become known to add metal coated glass spheres with the diameter range between 5 to 100 µm to the adhesive layer of a pressure-sensitive adhesive tape in order to influence the optical properties of the tape.

U.S. Pat. No. 4,579,882, teaches methods of making spheres and calculating the thickness of coatings. From this patent it has become known to mix a polymer as matrix material with metal coated powder of an inorganic material. The substance thus achieved serves for the coating of articles in order to obtain a shielding against electromagnetic waves. All at last described compositions do not include electrically insulating properties to make them suitable for higher voltages applications.

SUMMARY OF THE INVENTION

The invention provides a radially shrinkable sleeve for the enclosure of a connection or an end termination of a cable which can be manufactured inexpensively and is particularly suited for medium voltages up to 15 kV.

A sleeve according to one aspect of the invention consists of a radially innermost insulation layer of a homogeneous material having a relative dielectric constant larger than 3 and a dielectric strength of at least 10kV/mm.

Normally, field control material has a low dielectric strength. On the other hand, insulation material has no field controlling properties. The invention contemplates that a compromise can be achieved for both materials. If the innermost layer of a sleeve is provided with a dielectric constant which is larger than that of the insulation of the cable, namely larger than 3, it is possible to obtain a limited field controlling effect although this layer is an electrical insulator. In particular, in the medium voltage range up to 15 kV, the mentioned field controlling effect can be satisfactory. Therefore, a sleeve for enclosing a cable connection or a cable end termination needs only two layers, namely the already described field controlling and insulating layer and the outer shielding layer. Such a sleeve can be manufactured simply by co-extrusion.

Since for the inner central area of the sleeve according to the invention no electrode is provided, it may be necessary to wrap the conductor connection with, for example, a semi-conductive mastic tape having a relatively large dielectric constant in order to equalize the potential in the area of the connection. It is understood that also other known means could be used to arrive at the intended purpose, such as by means of a void-free medium having a relatively large dielectric constant or by means of a Faraday cage.

The sleeve according to the invention can be easily manufactured and has the further advantage that no particular adaptation to the length of a cable connection is necessary, rather, the sleeve according to the invention may have any length. The sleeve according to the invention can be reliably used for a relatively broad medium voltage range and for different sizes and types. The installation takes place without tools. The sleeve according to the invention is particularly suited in connection with mechanical support means, particularly a support core as disclosed in the DE 37 15 915.

As already mentioned, only two layers are necessary for the sleeve. If applied to a high medium voltage range, it may be appropriate to provide an additional insulating layer beyond what the insulating innermost layer provides, i.e. the field controlling effect, and the outer shielding layer. Also such sleeve structure can be molded by extrusion.

According to an alternative solution the invention provides for matrix of a dielectric plastic material and a content of microspheres, with the micropheres conductive totally or only at the surface thereof, having a diamter distribution of between 10 and 500 μm and being uniformly distributed in the matrix material, the compound thus achieved having a relative dielectric constant ≧3 and a dielectric strength of at least 5 kV/mm. Silicone rubber may be used as the matrix material, in particular liquid silicone rubber. However, other matrix materials can be used, for example, acrylester rubber (ANM), cellulose acetate (CA), epoxide (EP), nitrile rubber (NBR/NCR), polyamide (PA), polyacrylate (PAR), polycarbonate (PC), polyimide (PI), styrenebutadiene rubber (SBR), silicone (SI) or vinylacetate (VAC). It is essential that the matrix material have reasonable molding properties and the ability to be molded by known molding processes such as extrusion or injection molding. It is further essential that the structure or constitution of the matrix material be such that the spheres are not crushed or deteriorated by such molding process, that is, that the material have a relatively low viscosity.

The diameter range of the spheres is between 10 and 500 μm. Preferably, according to an embodiment of the invention, the diameter distribution is between 10 and 90 μm and preferably between 30 and 60 μm. These small spheres can be simply processed with conventional plastic molding methods and effect a satisfactory homogeneous distribution in the molded article. The relative dielectric constant obtained with this mass is ≧3, with the dielectric strength being at least 5 kV/mm.

The microspheres can be made of metal. Preferably, glass spheres are used, particularly hollow glass spheres or bubbles as for example known from "Scotchlite™ Glass Bubbles Hollow Micro Glass Spheres" product information and specification of 3M Company, St. Paul, Minn. of Jan 1, 1993. They are made of low alkali borosilicate glass and are chemically inactive. The bubbles have a size distribution of 96% in the range of 20 to 120 μm and of 60% in the range of 40 to 80 μm. If metal spheres are used, electrical conductivity is automatically available. If, however, glass spheres are used, a surface coating with a metal is mandatory. The coating may consist of for example, aluminum, nickel, silver, or the like. The metallic coating can be as thin as practical since significant current does not flow. Therefore, the coating may have, for example, a thickness of 0.001 μm.

According to a further embodiment of the invention, it may be appropriate to provide the spheres with an insulating coating. This applies to metal spheres and to metal coated glass spheres as well. In this case, touching of some spheres is not substantially injurious relative to the desired insulating effect. Such a coating may be very thin, for example 0.0004 μm. The preferred material for this coating is to be selected such that it is compatible with the metal or the metal coating in order to avoid a chemical reaction and to provide a sufficient adhesive capacity. For example, aluminum can be used for the metal coating and aluminum sub oxide as insulating coating. The coating of the non-conductive glass spheres with a metal can be carried out by conventional technologies, e.g. the sputter deposition process.

It has been found through experimentation that the system works both with spheres having the additional insulative oxide layer as well as with spheres which have the bare metal coating. The reason for this is that the spheres under normal circumstances are insulated from each other by the matrix material. Only very occasionally does contact between spheres occur which changes the electrical properties and then by only an insignificant amount. The additional coating may, however, be advantageous under certain circumstances. For example, it has been observed that during the molding process a higher concentration of spheres has been observed at corners of the mold cavity as a consequence of material flow behavior.

In particular with the use of glass spheres, it is essential that they are not crushed by the molding process. Therefore, liquid silicone rubber may be advantageously used because its viscosity is relatively low. A high viscosity would lead to a crushing of the spheres and further prevent the spheres from being uniformly distributed during the mixing process.

BRIEF DESCRIPTION OF THE DRAWINGS

Embodiments of the invention will be subsequently described at more detail in connection with drawings, wherein like numbers refer to like parts in the several views, and wherein.

Description Of Preferred Embodiments

An elastic sleeve 10 is placed on a supporting core 12 as already known. Sleeve 10 comprises an inner layer 14 and an outer layer 16 which, for example, are made by co-extrusion. The inner layer 14 is of an insulating material which also has a dielectric constant of $\geq 3$. The outer layer 16 is made of a suitable semi-conductive material.

Figure 3:
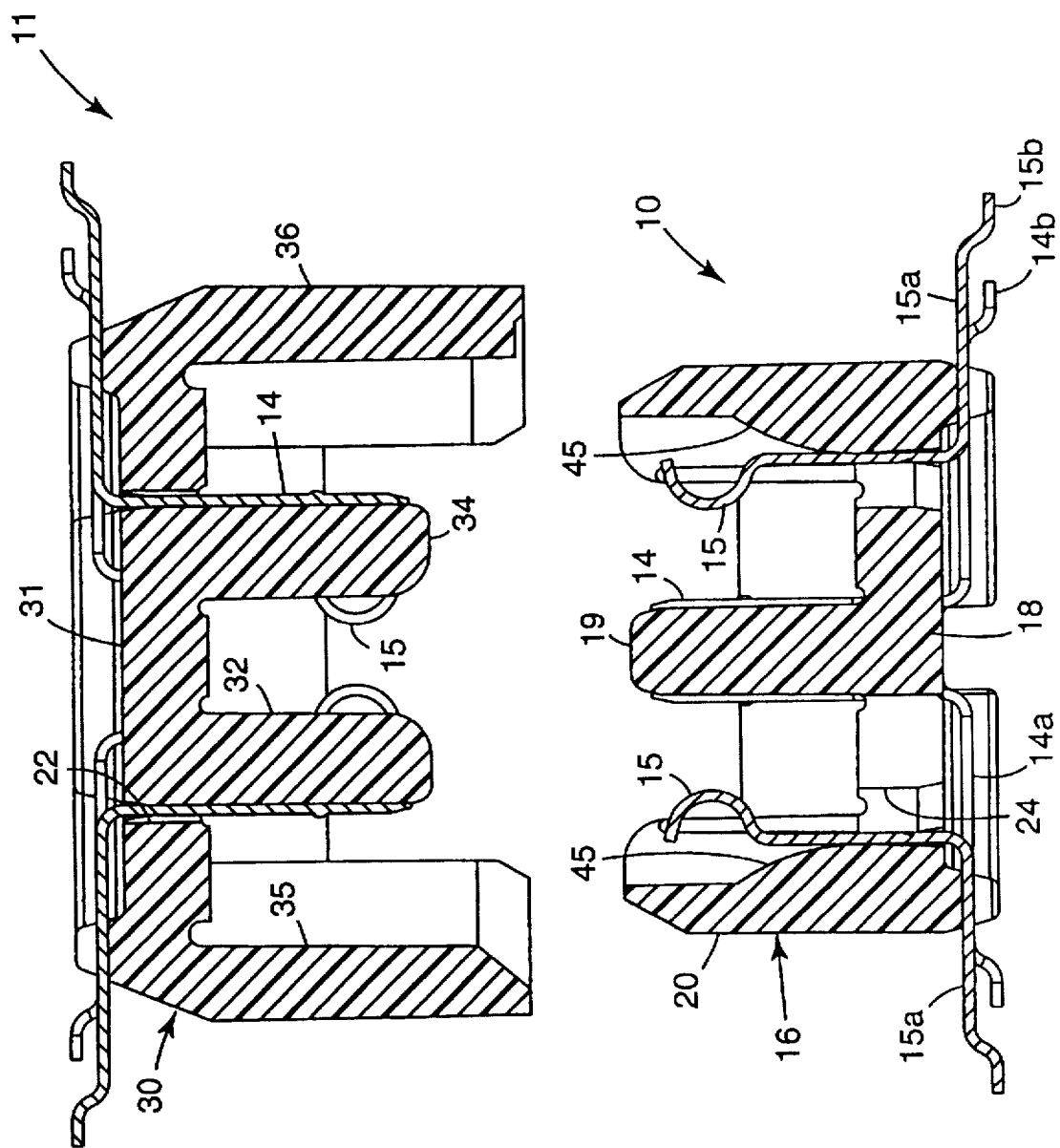
FIG. 3 is a perspective view similar to FIG. 2, and illustrates the sleeve of FIG. 2 after the installation on cable connection.
Figure 3A:
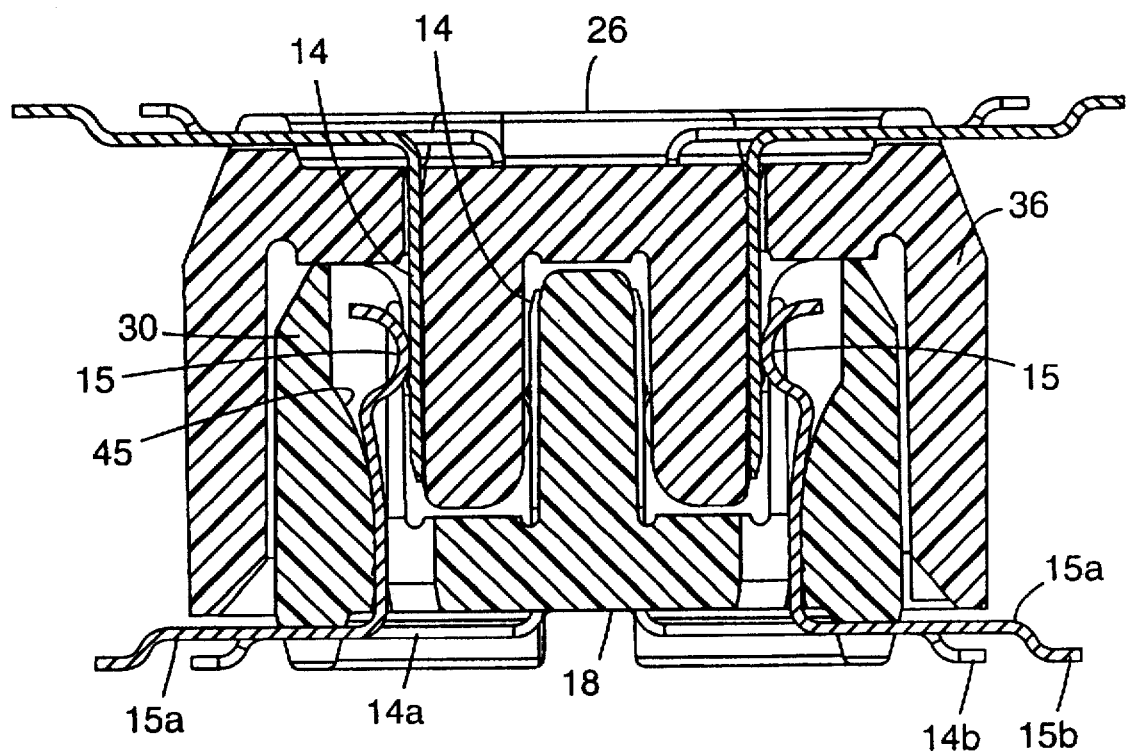

In FIG. 3 it is shown how sleeve 10 is placed on a cable connection. The cables 18, 20 include conductors 22, 24 which are interconnected through a connector 26 in a conventional manner.

It can be further seen in FIG. 3 that the connector area is wrapped by a semi-conductive mastic tape 28 in order to achieve a field equalizing effect in this area. As an alternative to the mastic tape 28, the sleeve 10 may be provided with a central electrode of a conductive or semi-conductive material which has been incorporated into the main body. Such an electrode is described in German patent no. P 39 43 296.3, which is hereby incorporated by reference.

The thickness of the cable insulation is 4.0 mm for a 10 kV cable and 4.5 mm for a 15 kV cable. The following values are achieved for a sleeve 10 according to FIG. 2:

Relative dielectric constant of inner layer 14: 3

Thickness of the inner layer 14: 8.5 mm

Dielectric strength of inner layer 14: 20 kV/mm

Dissipation factor: 0.0001

Figure 1:
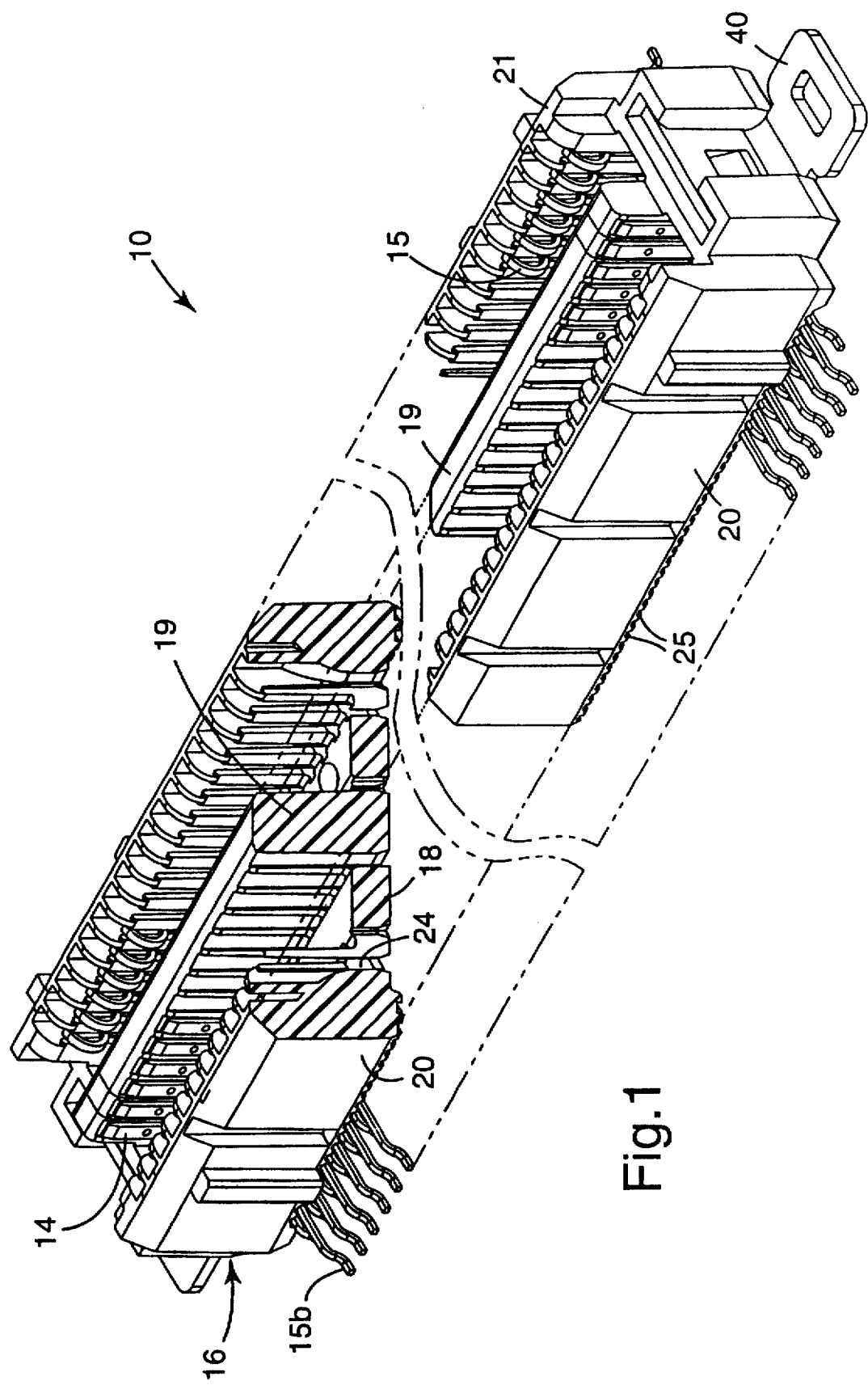
FIG. 1 is a graph of the specific resistivity, the dielectric strength, the relative dielectric constant and the dissipation factor relative to the volume content of glass bubbles in its matrix.
Figure 2:
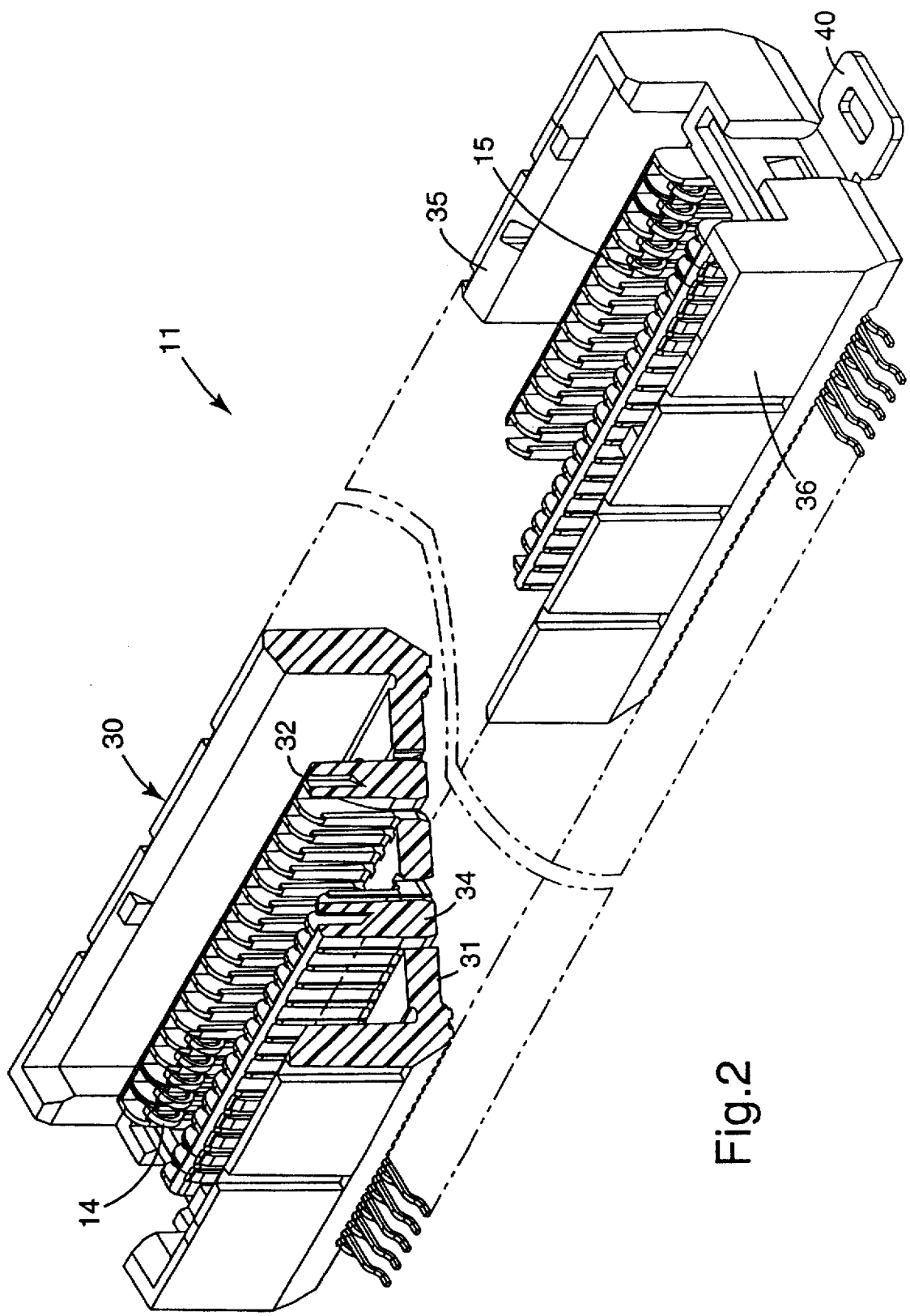
FIG. 2 is a perspective view, with a portion cut away, of a first embodiment of a shrinkable sleeve according to the invention.

The graph of FIG. 1 represents the relations for an insulating mass used for the inner layer 14 of a sleeve of FIG. 2. Liquid silicone rubber is matrix material is mixed with metallic coated glass bubbles. In FIG. 1, the abscissa represents the volume percent of glass bubbles in the matrix and the ordinate dielectric properties of the matrix. The line marked with the symbol "X" represents volume resistivity in units of Ωcm times $10^4$, the line marked with filled circles represents dielectric strength in units of kV/mm, the line marked with filled triangles represents the dielectric constant Er divided by 10, and the line marked with filled squares represents the dissipation factor tan d divided by 1000. The specific gravity of the glass bubbles is 0.6. Its hydrostatic compression strength is 7000 N/cm². The size distribution of the spheres is as follows:

| Sieve Size (μm) | Percent Passing Through Sieve |
| --- | --- |
| 88 | 100 |
| 62 | 93.7 |
| 44 | 73.7 |
| 31 | 50.5 |
| 22 | 30.5 |
| 16 | 15.8 |
| 11 | 7.4 |
| 7.8 | 2.1 |
| 5.5 | 0.0 |

The glass bubbles are coated with aluminum, with the coating having a thickness of 100 Angstroms while the insulating layer of aluminum oxide coated on the metallic coating has a thickness of 40 Angstroms. The graph of FIG. 1 reveals that the specific resistivity is constant above 2% by volume and has a value in the order of $6 \times 10^{13}$ Ωcm. The dielectric strength in the range of 18 kV/mm which is particularly satisfactory for the medium voltage range. The dissipation factor is about 0.0001. At a volume content of 2%, the relative dielectric constant is somewhat above 3 while it is 4 at a volume content of 10%.

The above mentioned values for the inner layer 14 of sleeve 10 of FIG. 2 are therefore achieved at a volume content of glass bubbles of 2%.

Figure 4:
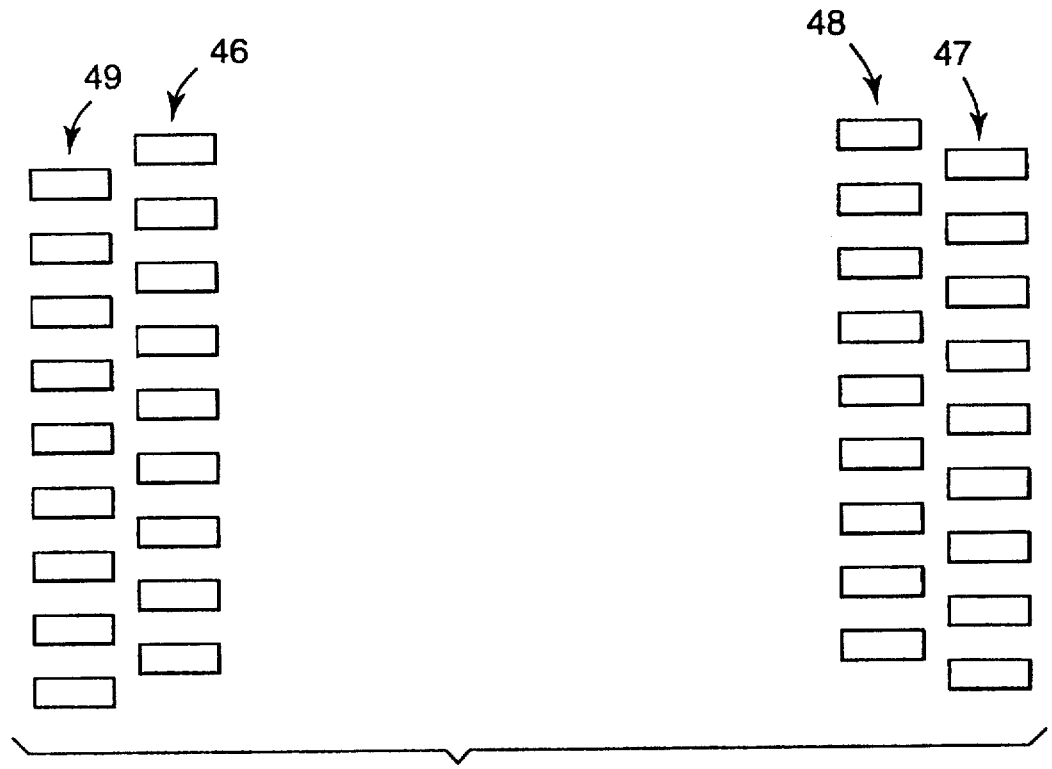
FIG. 4 shows a second embodiment according to the invention.

The sleeve 10a Of FIG. 4 differs from that, of FIG. 2 in that an additional insulating layer 30 is located between the insulating inner layer 14 and a shielding layer 16. Sleeve 10a can be made by co extrusion or by a successive injection molding. The second insulating layer 30 can be made of a conventional flexible insulating material, e.g. silicone rubber or liquid silicone rubber. The inner layer 14 corresponds to that of FIG. 2.

Sleeve 10 of FIG. 2 is suited for the medium voltage range up to 15 kV, while the sleeve of FIG. 4 can be used for medium voltages above 15 kV.

In addition to the above mentioned material for the layers 14 of FIGS. 2 and 4, the following compositions can be provided:

(1) 100 parts methylvinyl silicone rubber (HDU) (e.g. silicone rubber R 420/40 U of the German company Wacker) 10 parts carbon black N 765 0.9 parts dicumyl peroxide The following electrophysical properties are achieved:

Relative dielectric constant $\epsilon_r = 4.6$

Resistivity: $= 3 \times 10^{14}$ Ωcm

Dielectric strength: = 10 kV/mm (2) Substances and parts as mentioned above, however carbon black type N 683 is used The following electrophysical properties are achieved:

Relative dielectric constant $\epsilon_r = 3.5$

Resistivity: $= 5 \times 10^{14}$ Ωcm

Dielectric strength: = 12 kV/mm

It has been found that it is possible to optimize the electrical properties of the inner layer according to the requirements of the specific intended use. The main properties, namely the relative dielectric constant and the dielectric strength, can be varied within certain limits by selecting the diameter range of the glass bubbles, the thickness of the aluminum coating and the concentration of the glass bubbles in the matrix material.

This can be best seen from the FIGS. 5 through 8. These result from a set of experiments as described below which allowed optimization of bubble properties. In a specific set of experiments the glass bubbles referred to in the description of FIG. 1 were used with the following differences:

Glass bubbles were obtained having different thickness of the aluminum coating, namely, 23.6 Angstroms, 44.3 Angstroms, 63.8 Angstroms, 132.2 Angstroms and 160.0 Angstroms.

Furthermore, these glass bubbles were sieved yielding the following diameters, 0–32 microns, 32–50 microns, 50–80 microns and 80–125 microns.

The samples were prepared in the following manner:

Mixing 200 grams of material — liquid silicone rubber no. 2030 parts A and B 1:1 plus the calculated quantity of glass bubbles — with a hand-held kneader for 5 minutes. The mixed compound was evacuated at 50 mbars for 30 minutes and press-molded immediately afterwards. Molding was done by filling the mix into a press-mold to 60° C., transferring the mold into the preheated press and molding for 10 minutes at 145° C.

The slabs were then post cured for 4 hours at 200° C.

Electrical properties resistivity, dissipation factor, relative dielectric constant and dielectric strength were measured without silver paint according to VDE (Verband Deutscher Elektrotechniker) 0303 Part 4. The property values were averages of three slabs.

Figure 5:
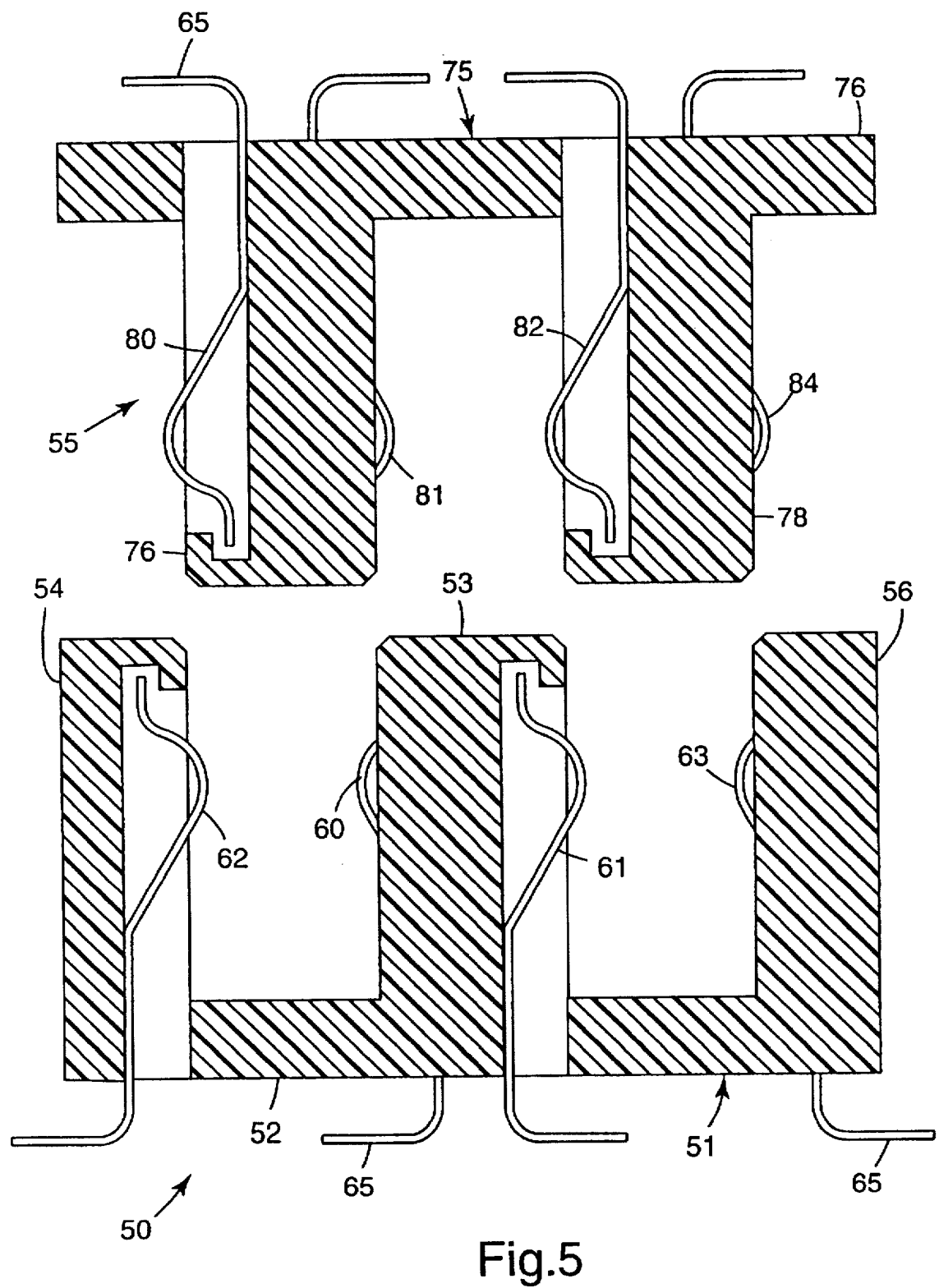
FIG. 5 is a graph of the dielectric constant versus size distribution of glass bubbles in its matrix.

FIG. 5 shows the dependence of the dielectric constant on the size distribution of the glass bubbles. The abscissa is sieve mesh in microns and the ordinate is dielectric constant. The line marked with filled squares represents an aluminum coating on the glass bubbles of 23.6 Angstroms, the filled diamonds 44.3 Angstroms, the filled triangles 63.8 Angstroms, the open squares 123.2 Angstroms, the open diamonds 160 Angstroms, and the open triangles 160 Angstroms unsieved. The measurement points were placed on the upper limit of the sieving range (e.g. the values at 32 microns represent glass bubbles in the range of 0–32 microns, etc.) It can be seen that the dielectric constant increases up to the range of 50–80 microns with a weak dependence on the thickness of the aluminum coating. For comparative reasons the value for unsieved glass bubbles with a coating thickness of 160 Angstroms is indicated which essentially corresponds to the material used in FIG. 1.

Furthermore, it can be seen that the coating thickness should not be too small and preferably be in the range of 40–60 Angstroms.

Figure 6:
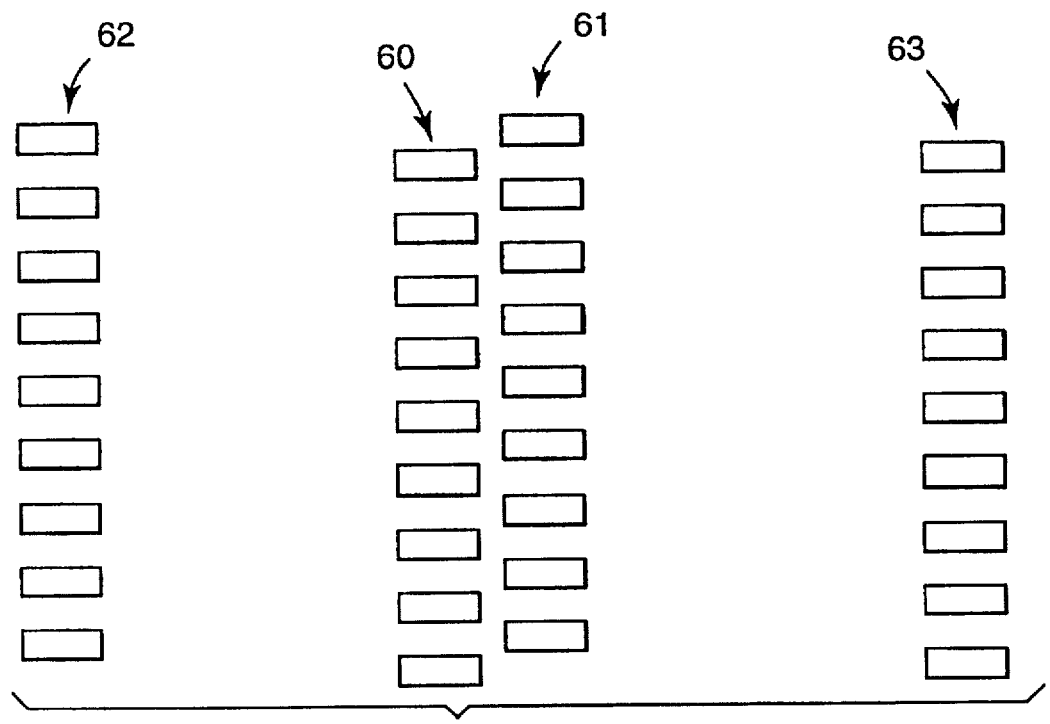
FIG. 6 is a graph of is a graph of the dielectric strength versus size distribution of glass bubbles in its matrix.

FIG. 6 shows the corresponding relationship for the dielectric strength. The abscissa represents sieve mesh in microns and the ordinate dielectric strength in kV/mm. The line marked with filled squares represents an aluminum coating on the glass bubbles of 23.6 Angstroms, the filled diamonds 44.3 Angstroms, the filled triangles 63.8 Angstroms, the open squares 123.2 Angstroms, the open diamonds 160 Angstroms, and the open triangles 160 Angstroms unsieved. Here the opposite trend can be observed, namely a reduction when moving to larger particles. However, a stable situation is reached when using glass bubbles ranging above to 80 microns. The influence of the coating thickness is also moving in the opposite direction yielding the best values at 23.6 Angstroms. Also here the unsieved fraction is indicated.

Figure 7:
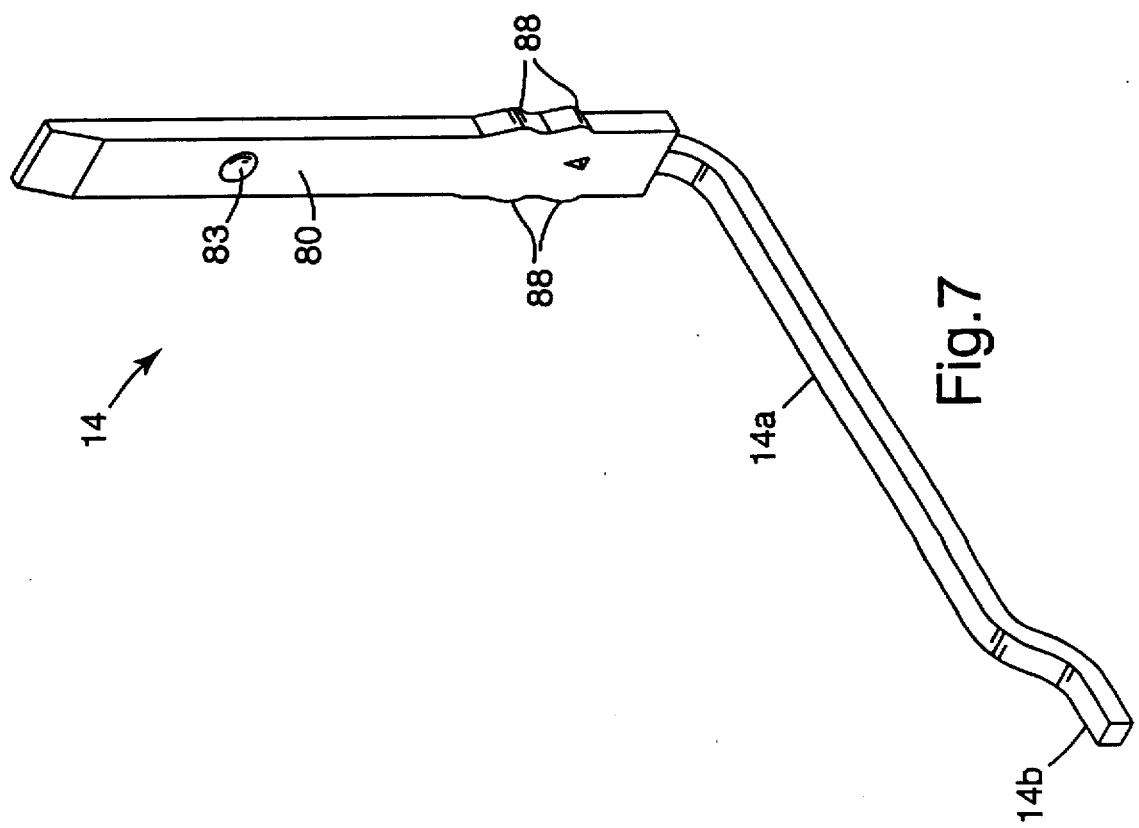
FIG. 7 is a graph of dielectric constant versus percent weight of the glass bubbles.

In FIG. 7, the abscissa represents percent weight of glass bubbles in the matrix and the ordinate dielectric constant. The line marked with filled squares represents an aluminum coating on the glass bubbles of 23.6 Angstroms, the filled diamonds 44.3 Angstroms, the filled triangles 63.8 Angstroms, the open squares 123.2 Angstroms, and the open diamonds 160 Angstroms. FIG. 7 demonstrates that the dependence of the coating thickness of the glass bubbles is rather weak and that the main determining factor for the dielectric constant is the percent weight of the glass bubbles.

Figure 8:
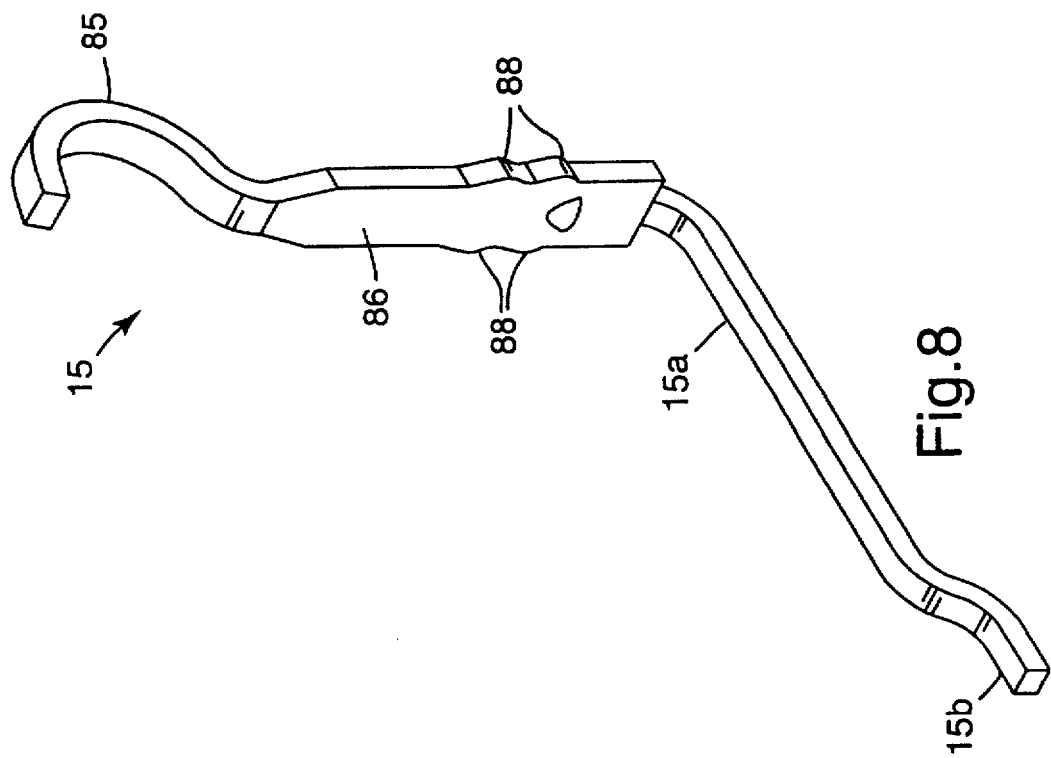
FIG. 8 is graph of dielectric strength versus percent weight of the glass bubbles along with the average dielectric constant of the glass bubbles of FIG. 7

In FIG. 8 the abscissa represents percent weight of glass bubbles in the matrix, the ordinate on the left side represents dielectric constant, and the ordinate on the right side represents dielectric strength in kV/mm. The line marked with filled squares represents an aluminum coating on the glass bubbles of 23.6 Angstroms, the filled diamonds 44.3 Angstroms, the filled triangles 63.8 Angstroms, the open squares 123.2 Angstroms, the open diamonds 160 Angstroms, and the open triangles the average value of dielectric constant taken from FIG. 7 for comparison. FIG. 8 on the other hand shows that this is not the case for the dependence of the dielectric strength, the values of which are marked on the right side of the diagram. Here it can be more clearly seen that the smaller the aluminum coating thickness is, the better the dielectric strength which can be obtained.

Using experimental methods of this type it is possible to achieve the required optimization. For example, using glass bubbles of the sieving range of 32–50 microns and a coating thickness of 44.3 Angstroms and a percentage weight of 5% a relative dielectric constant of 3.85 and a dielectric strength of 16.5 kV/mm is obtained. Alternatively, when choosing the same sieve size of the glass bubbles, namely 32–50 microns, but an aluminum coating of 23.6 Angstroms and a percentage weight of 3k, the dielectric constant would be reduced to 3.45 and the dielectric strength would increase to 21 kV/mm.

We claim:

1. Cylindrical radially shrinkable sleeve for enclosing a connection or an end termination of an electrical cable, in particular for a medium voltage cable, having insulation surrounded by a shielding layer, said sleeve comprising an outer shielding layer of semiconductive material, and at least one insulation layer on the inner side of said shielding layer, with the layers made of permanent flexible material adapted to be retained in a radially expanded state by mechanical support means, characterized in that at least a portion of said insulation layer is a homogeneous material having
a) a relative dielectric constant >3 and
b) dielectric strength of at least 10 kV/mm.

2. The sleeve of claim 1, characterized in that said insulation layer is a single inner layer.

3. The sleeve of claim 1, characterized in that said insulation layer is methylvinyl silicone rubber.

4. The sleeve of claim 1, characterized in that a central electrode of a conductive or semi-conductive material is incorporated into the layers.

5. Cylindrical radially shrinkable sleeve for enclosing a connection or an end termination of an electrical cable, in particular for a medium voltage cable, having insulation surrounded by a shielding layer, said sleeve comprising an outer shielding layer of semi-conductive material and at least one insulation layer on the inner side of said shielding layer, with the layers made of permanent flexible material adapted to be retained in a radially expanded state by mechanical support means, characterized in that at least a portion of said insulation layer comprises a matrix of dielectric plastic material and a content of microspheres conductive at least at a surface thereof and having a diameter distribution of between 10 and 500 µm, said microspheres being uniformly distributed in said matrix material, the matrix material and microspheres forming a mixture having:
a) a relative dielectric constant >3 and
b) a dielectric strength of at least 5 kV/mm.

6. The sleeve of claim 5, characterized in that silicone rubber is said matrix material.

7. The sleeve of claim 5, characterized in that the diameter of said microspheres differ from each other not more than one order of magnitude.

8. The sleeve of claim 7, characterized in that the diameter distribution of said microsphere is between 10 and 90 μm, preferably between 30 and 60 μm.

9. The sleeve of claim 5, characterized in that said microspheres are metal spheres.

10. The sleeve of claim 5, characterized in that said microspheres are glass spheres being coated with a metal.

11. The sleeve of claim 10, characterized in that said coating is of aluminum, nickel, or silver.

12. The sleeve of claim 10, characterized in that the thickness of said coating is about 0.001 μm.

13. The sleeve of claim 5, characterized in that said microspheres are coated with a thin insulating layer.

14. The sleeve of claim 13, characterized in that the thickness of said insulating layer is about 0.0004 μm.

15. The sleeve of claim 13, wherein the insulating layer is aluminum oxide.

16. The sleeve of claim 5, characterized in that the content of said microspheres is between 2 and 12% by volume, relative to said matrix material.

17. The sleeve of claim 5, characterized in that the relative dielectric constant is between 3 and 10.

18. The sleeve of claim 5, characterized in that the mixture having a dissipation factor is less than 0.01.

19. Electrically insulating, moldable mass having field control properties, in particular for the use in the medium voltage range, comprising a matrix of dielectric plastic material and a percentile share of microspheres electrically conductive either totally or at an outer surface thereof and having a diameter between 10 and 500 μm, said microspheres being uniformly mixed into said matrix material, the matrix material and the microspheres forming a compound having a) a dielectric constant equal to or larger than 3 and b) a dielectric strength of at least 5 kV/mm.

20. The mass of claim 19, characterized in that the relative dielectric constant is between 3 and 10.

21. The mass of claim 20, wherein the dielectric constant is between 3 and 4.

22. The mass of claim 19, characterized in that the dielectric strength is at least 10 kV/mm.

23. The mass of claim 19, characterized in that the compound having a dissipation factor is <0.01, preferably <0.001.

24. The mass of claim 19, characterized in that the diameter of said microspheres does not differ from each other by more than one order of magnitude.

25. The mass of claim 19, characterized in that a diameter distribution of said microspheres is between 10 and 90 μm.

26. The mass of claim 25, wherein a diameter distribution of said microspheres is between 30 and 60 μm.

27. The mass of claim 19, characterized in that the microspheres are metallic microspheres or metal-coated glass microspheres.

28. The mass of claim 27, characterized in that said coating consists of aluminum, nickel, or silver.

29. The mass of claim 28, characterized in that said microspheres are coated with a thin insulating layer.

30. The mass of claim 29, wherein the insulating layer is aluminum oxide.

31. The mass of claim 29, wherein the insulating layer has a thickness of about 0.0004 μm.

32. The mass of claim 28, wherein the coating has a thickness of about 0.001 μm.

33. The mass of claim 27, wherein the glass microspheres are hollow.

34. The mass of claim 19, characterized in that a content of said microspheres is between 2 and 20% by volume relative to said matrix material.

35. The mass of claim 19, characterized in that silicone rubber is used as said matrix material.

* * * * *

UNITED STATES PATENT AND TRADEMARK OFFICE
CERTIFICATE OF CORRECTION

PATENT NO. : 5,756,936
DATED : May 26, 1998
INVENTOR(S) : Manfred Viebranz, et al It is certified that error appears in the above-identified patent and that said Letters Patent is hereby corrected as shown below:

On the title page, showing the illustrative figure 1, should be deleted and substituted with the attached title page.

Signed and Sealed this

Eighth Day of September, 1998

Attest:

BRUCE LEHMAN

*Attesting Officer*  *Commissioner of Patents and Trademarks*

United States Patent

Viebranz et al.

[11] Patent Number: 5,756,936
[45] Date of Patent: May 26, 1998

[54] CYLINDRICAL RADIALLY SHRINKABLE SLEEVE FOR AN ELECTRICAL CABLE AND COMPOSITION THEREOF

[75] Inventors: Manfred G. G. Viebranz, Appel; Raymond A.W. Krabs, Hamburg; Dieter Hellbusch, Seevetal; Burkhard Muenchow, Hamburg, all of Germany; Craig Chamberlain, Woodbury, Minn.; Winfried H. Knorr, Hamburg, Germany

[73] Assignee: Minnesota Mining and Manufacturing Company, Saint Paul, Minn.

[21] Appl. No.: 718,526

[22] PCT Filed: May 17, 1995

[86] PCT No.: PCT/US95/06125

§ 371 Date: Oct. 8, 1996

§ 102(e) Date: Oct. 8, 1996

[87] PCT Pub. No.: WO95/31845

PCT Pub. Date: Nov. 23, 1995

[30] Foreign Application Priority Data

May 18, 1994 [DE] Germany ............. 44 17 363.6
May 18, 1994 [DE] Germany ............. 44 17 364.4

[51] Int. Cl.$^6$ ............................. H02G 15/184
[52] U.S. Cl. ............. 174/73.1; 174/74 A; 174/84 R; 174/DIG. 8
[58] Field of Search ............. 174/73.1, 84 R, 174/DIG. 8, 72 C, 74 A

[56] References Cited

U.S. PATENT DOCUMENTS

| | | | |
|---|---|---|---|
| 3,585,274 | 6/1971 | Tomaszewski et al. | 174/73.1 |
| 3,670,091 | 6/1972 | Frantz et al. | 174/52.2 |
| 3,816,639 | 6/1974 | Anderson et al. | 174/73.1 |
| 4,304,616 | 12/1981 | Richardson | 174/73.1 X |
| 4,412,029 | 10/1983 | Kehr et al. | 524/441 |
| 4,579,882 | 4/1986 | Kambe et al. | 523/137 |

FOREIGN PATENT DOCUMENTS

| | | | |
|---|---|---|---|
| 0379056 A3 | 7/1990 | European Pat. Off. | |
| 0424090 A2 | 4/1991 | European Pat. Off. | |
| 0435569 A1 | 7/1991 | European Pat. Off. | |
| 1805353 | 6/1969 | Germany | |
| 3226380 A1 | 2/1983 | Germany | 174/73.1 |
| 2042818 | 9/1980 | United Kingdom | |

Primary Examiner—Kristine L. Kincaid
Assistant Examiner—Chau N. Nguyen
Attorney, Agent, or Firm—Matthew B. McNutt

[57] ABSTRACT

A cylindrical radially shrinkable sleeve (10) for enclosing a connection or an end termination of an electrical cable having an insulation surrounded by a shielding layer. The sleeve (10) has an outer shielding layer (16) of semi-conductive material and at least an insulation layer (14) on the inner side of the shielding layer (16). The cylindrical layers are made of flexible material adapted to be retained in a radially expanded state by a mechanical support. The radially innermost layer is of a homogeneous material having a relative dielectric constant which is larger than that of the insulation of the cable. The material is a matrix of dielectric plastic material containing microspheres which are electrically conductive either totally or only at the outer surface thereof, and which have a diameter between 10 and 500 μm. The microspheres are uniformly mixed into the matrix material, with the compound having a dielectric constant equal to or larger that 3 in a dielectric strength of at least 5 kV/mm.

35 Claims, 7 Drawing Sheets

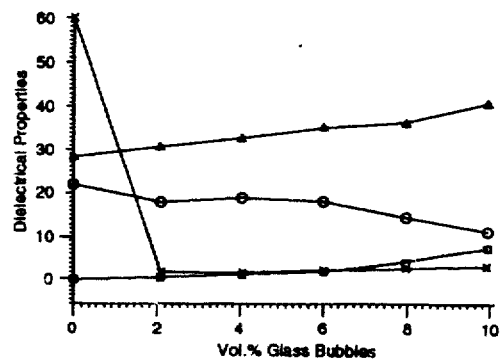

UNITED STATES PATENT AND TRADEMARK OFFICE
CERTIFICATE OF CORRECTION

PATENT NO.: 5,756,936
DATED: May 26, 1998
INVENTOR(S): Manfred Viebranz, Raymond Krabs, Dieter Hellbusch, Burkhard Muenchow, Craig Chamberlain, and Winfried Knorr It is certified that error appears in the above-identified patent and that said Letters Patent is hereby corrected as shown below:

Please replace incorrect drawings on issued patent with the following correct drawings.

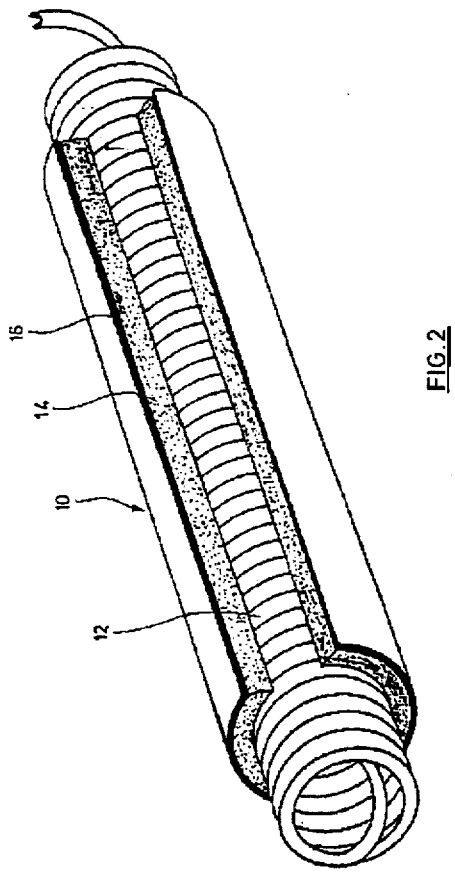

FIG. 2

UNITED STATES PATENT AND TRADEMARK OFFICE
CERTIFICATE OF CORRECTION

PATENT NO.: 5,756,936

DATED: May 26, 1998

INVENTOR(S): Manfred Viebranz, Raymond Krabs, Dieter Hellbusch, Burkhard Muenchow, Craig Chamberlain, and Winfried Knorr It is certified that error appears in the above-identified patent and that said Letters Patent is hereby corrected as shown below:

Please replace incorrect drawings on issued patent with the following correct drawings.

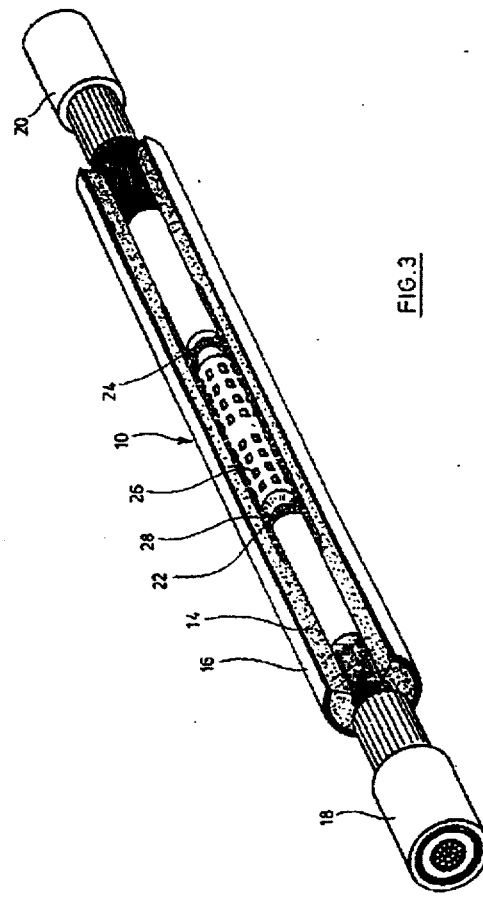

UNITED STATES PATENT AND TRADEMARK OFFICE
CERTIFICATE OF CORRECTION

PATENT NO.: 5,756,936

DATED: May 26, 1998

INVENTOR(S): Manfred Viebranz, Raymond Krabs, Dieter Hellbusch, Burkhard Muenchow, Craig Chamberlain, and Winfried Knorr It is certified that error appears in the above-identified patent and that said Letters Patent is hereby corrected as shown below:

Please replace incorrect drawings on issued patent with the following correct drawings.

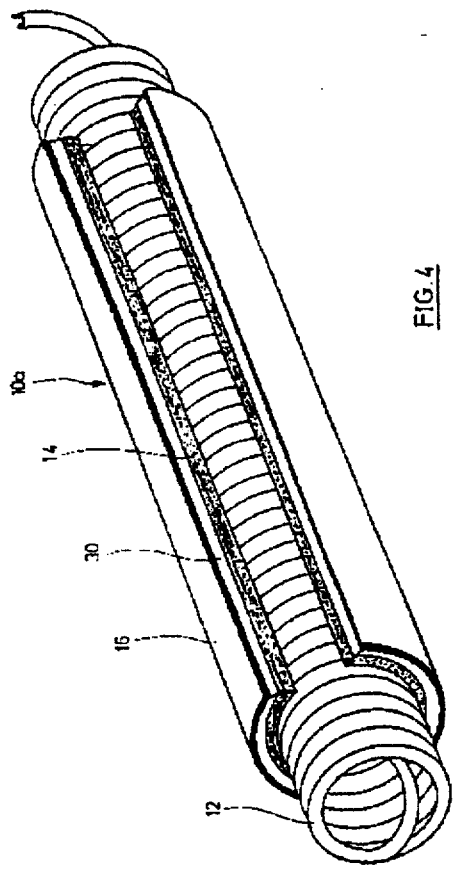

FIG. 4

UNITED STATES PATENT AND TRADEMARK OFFICE
CERTIFICATE OF CORRECTION

PATENT NO. : 5,756,936
DATED : May 26, 1998
INVENTOR(S) : Manfred Viebranz, Raymond Krabs, Dieter Hellbusch, Burkhard Muenchow, Craig Chamberlain, and Winfried Knorr It is certified that error appears in the above-identified patent and that said Letters Patent is hereby corrected as shown below:

Please replace incorrect drawings on issued patent with the following correct drawings.

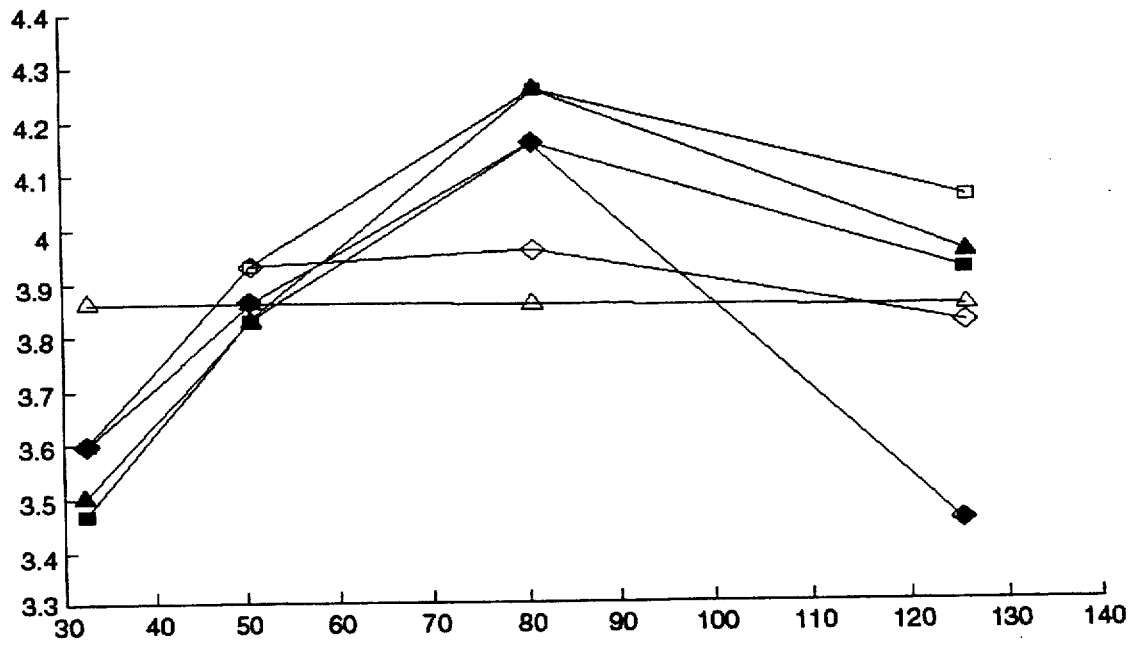

FIG.5

UNITED STATES PATENT AND TRADEMARK OFFICE
CERTIFICATE OF CORRECTION

PATENT NO.  : 5,756,936

DATED       : May 26, 1998

INVENTOR(S) : Manfred Viebranz, Raymond Krabs, Dieter Hellbusch, Burkhard Muenchow, Craig Chamberlain, and Winfried Knorr It is certified that error appears in the above-identified patent and that said Letters Patent is hereby corrected as shown below:

Please replace incorrect drawings on issued patent with the following correct drawings.

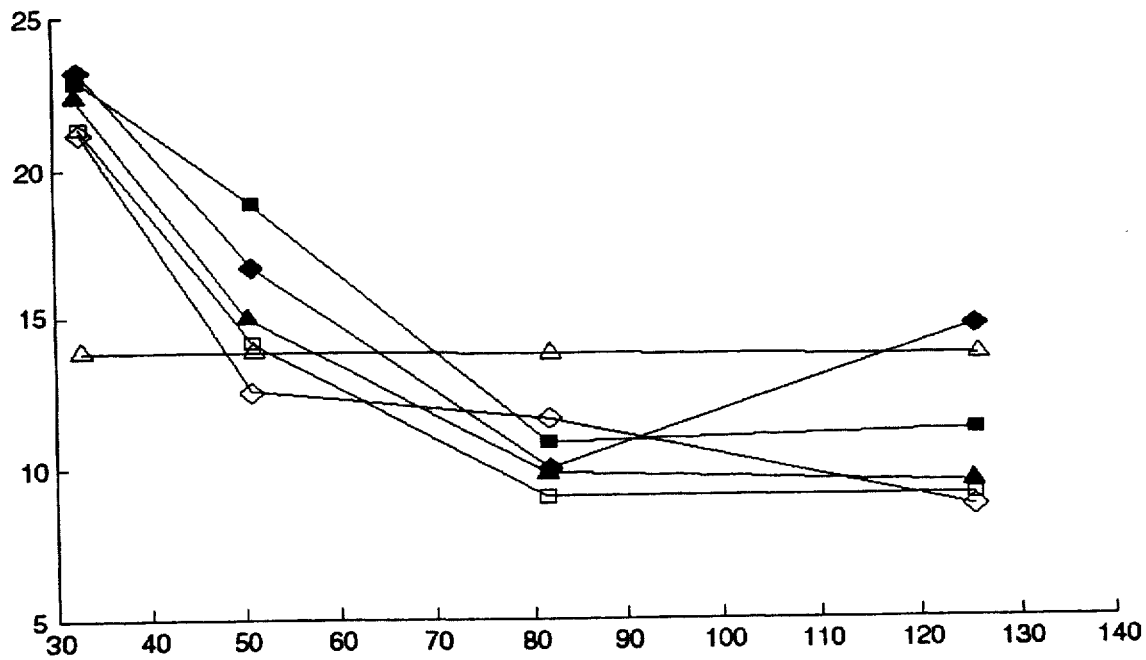

FIG.6

UNITED STATES PATENT AND TRADEMARK OFFICE
CERTIFICATE OF CORRECTION

PATENT NO. : 5,756,936　　　　　　　　　　　　　Page 8 of 9
DATED : May 26, 1998
INVENTOR(S) : Manfred Viebranz, Raymond Krabs, Dieter Hellbusch, Burkhard Muenchow, Craig Chamberlain, and Winfried Knorr It is certified that error appears in the above-identified patent and that said Letters Patent is hereby corrected as shown below:

Please replace incorrect drawings on issued patent with the following correct drawings.

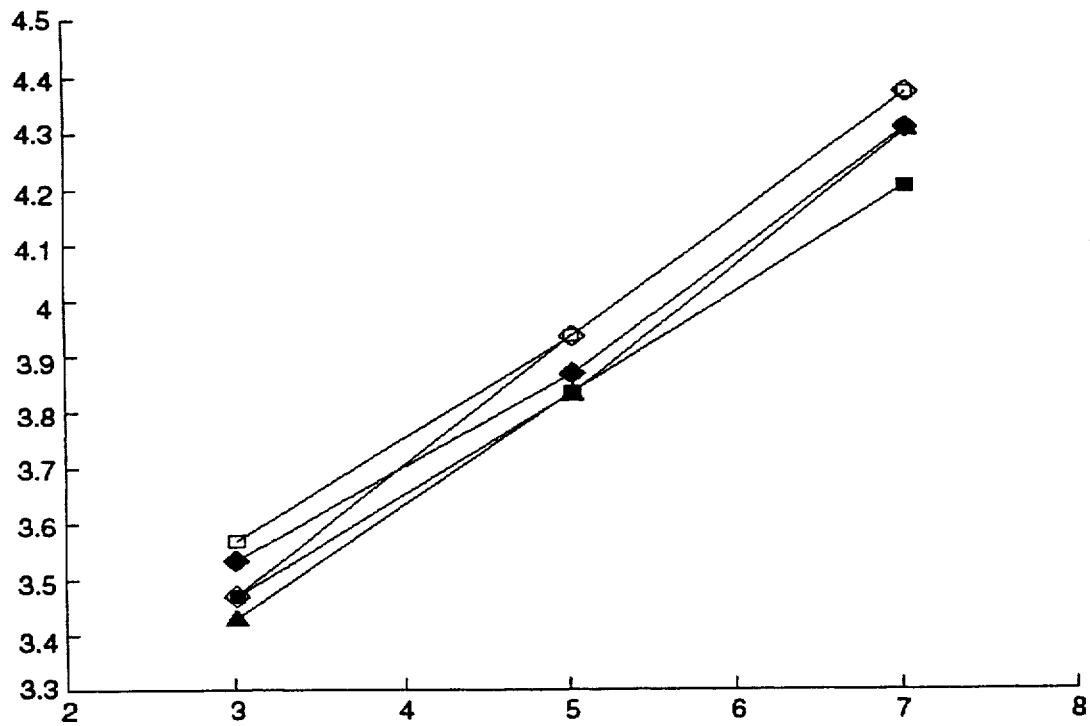

FIG.7

UNITED STATES PATENT AND TRADEMARK OFFICE
CERTIFICATE OF CORRECTION

PATENT NO. : 5,756,936
DATED : May 26, 1998
INVENTOR(S) : Manfred Viebranz, Raymond Krabs, Dieter Hellbusch, Burkhard Muenchow, Craig Chamberlain, and Winfried Knorr It is certified that error appears in the above-identified patent and that said Letters Patent is hereby corrected as shown below:

Please replace incorrect drawings on issued patent with the following correct drawings.

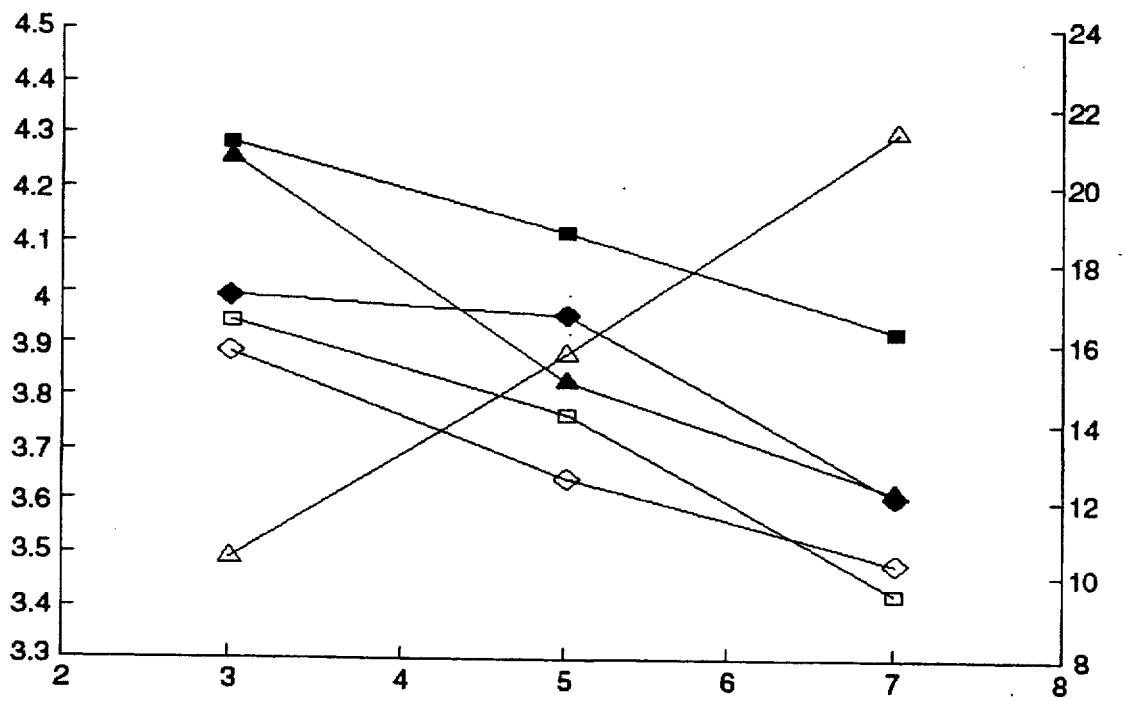

FIG.8